United States Patent [19]

Hosler et al.

[11] 3,929,923

[45] Dec. 30, 1975

[54] PROCESS FOR PREPARATION OF ISOMERS OF 1-CYCLOHEXYL-1,3,3-TRIMETHYLHYDRINDANE

[75] Inventors: Peter Hosler, Wallingford; David S. Gates, Swarthmore, both of Pa.

[73] Assignee: Sun Research and Development Co., Philadelphia, Pa.

[22] Filed: Jan. 17, 1972

[21] Appl. No.: 218,338

[52] U.S. Cl. ............................................... 260/667
[51] Int. Cl.$^2$............................................. C07C 5/10
[58] Field of Search .................................... 260/667

[56] References Cited
UNITED STATES PATENTS 2,629,751  2/1953  Wiggins ............................. 260/667
3,411,369  11/1968  Hammann et al. .................. 74/200

*Primary Examiner*—Veronica O'Keefe
*Attorney, Agent, or Firm*—George L. Church; Donald R. Johnson; J. Edward Hess

[57] ABSTRACT

A process is disclosed for the hydrogenation of 1-phenyl-1,3,3-trimethylindane to prepare selected isomers. For example 4,9-cis,1-cyclohexyl-1,3,3-trimethylhydrindane, a fluid with improved tractive properties, can be prepared using a catalyst containing nickel, palladium or rhodium at a hydrogen pressure in the range of 600 to 1500 p.s.i.g., and a temperature substantially in the range of 200°C. to 225°C.

12 Claims, 2 Drawing Figures

PROCESS FOR PREPARATION OF ISOMERS OF 1-CYCLOHEXYL-1,3,3-TRIMETHYLHYDRINDANE

CROSS REFERENCES TO RELATED APPLICATIONS

The present application is related to the following listed applications:

| Serial No. | Filing Date | Title/Inventor(s) |
|---|---|---|
| 679,833 (Now U.S. 3,595,796 issued 7-27-71) | 11-1-67 | Traction Drive Transmission Containing Naphthenes, Branched Paraffins, or Blends of Naphthenes and Branched Paraffins as Lubricant - IRL N. DULING and DAVID S. GATES |
| 679,834 (Now U.S. 3,595,797 issued 7-27-71) | 11-1-67 | Blending Branched Paraffin Fluids for Use in Traction Drive Transmission - IRL N. DULING-DAVID S. GATES-MARCUS W. HASELTINE |
| 679,851 (Now U.S. 3,598,740, issued 8-10-71) | 11-1-67 | Traction Drive Transmission Containing Paraffinic Oil as Lubricant - IRL N. DULING-DAVID S. GATES-THOMAS D. NEWINGHAM |
| 794,844 (Now U.S. 3,608,385, issued 9-28-71) | 1-24-69 | Friction Drive Fluid - IRL N. DULING and FREDERICK P. GLAZIER |
| 812,516 (Now U.S. 3,619,414, issued 11-9-71) | 2-19-69 | Catalytic Hydrofinishing of Petroleum Distillates in the Lubricating Oil Boiling Range - IVOR W. MILLS-MERRITT C. KIRK, JR.-ALBERT T. OLENZAK |
| 850,717 (now abandoned) | 8-18-69 | Hydrorefined Lube Oil and Process of Manufacture - IVOR W. MILLS and GLENN R. DIMELER |
| 3,256 (Now U.S. 3,648,531 issued 3-14-72) | 8-19-69 | Friction or Tractive Drive Fluid - IRL N. DULING-FREDERICK P. GLAZIER-DAVID S. GATES and ROBERT E. MOORE |
| 33,023 (Now abandoned) | 4-29-70 | Combination of Tractive Drive and Traction Fluid Comprising Cyclic or Acyclic Compounds - IRL N. DULING-FREDERICK P. GLAZIER |
| 52,301 | 7-6-70 | Polyisobutylene Oil Having a High Viscosity Index - GARY L. DRISCOLL-IRL N. DULING-DAVID S. GATES |
| 78,190 | 10-5-70 | Process of Preparing Synthetic Lubricants from Low Molecular Olefins - RICHARD S. STEARNS-IRL N. DULING-DAVID S. GATES |
| 78,191 (Now U.S. 3,676,521 issued 7-11-72) | 10-5-70 | Synthetic Lubricants from Low Molecular Weight Olefins- RICHARD S. STEARNS-IRL N. DULING-DAVID S. GATES |
| 116,985 | 2-19-71 | Lubricant for Controlled-Slip Differential - THOMAS D. NEWINGHAM-ALEXANDER D. PECCHUITE-JOHN Q. GRIFFITH, III-MARCUS W. HASELTINE, JR. |
| 155,986 | 6-23-71 | Blended Traction Fluid Containing Cyclic Compounds- IRL N. DULING-DAVID S. GATES |
| 162,773 | 7-15-71 | Method for Improving the Coefficient of Traction Using Hydrogenated Polymeric Styrenes - IRL N. DULING-DAVID S. GATES |
| 162,896 | 7-15-71 | Blanched Olefin Polymers as Tractants - IRL N. DULING-DAVID S. GATES |
| 163,543 | 7-15-71 | $C_{13}$–$C_{39}$ Naphthenes as Tractants - IRL N. DULING-DAVID S. GATES |
| 163,545 | 7-15-71 | Hydrorefined Naphthenic Oil as a Tractant - DAVID S. GATES-IRL N. DULING |
| 165,418 | 7-15-71 | Blended Traction Fluid Containing Hydrogenated Polyolefin - IRL N. DULING-DAVID S. GATES-FREDERICK P. GLAZIER-ROBERT E. MOORE-THOMAS D. NEWINGHAM |

The disclosure of all of the above cited applications is hereby incorporated herein (by this reference). In particular, these applications disclose blended lubricants which can be prepared from the products of the process of the present invention, additives which can be useful in such lubricants and processes for making individual components of such blends.

BACKGROUND OF THE INVENTION

The prior art described methods of preparation of 1-cyclohexy-1,3,3-trimethylhydrindane by the hydrogenation of 1-phenyl-1,3,3-trimethylhydrindane, a dimer of alphamethylstyrene. However, the configurational isomers of the hydrogenated product have not been reported, nor have specific preparative methods for all of the isomers been disclosed.

Wiggins, U.S. Pat. No. 2,629,751, issued Feb. 24, 1953, has described the hydrogenation of 1-phenyl-1,3,3-trimethylindane at 300 p.s.i.g., at temperatures beginning at 170°C. and going to 325°C. However, the Wiggins product appears to be mostly a low boiling isomer, with unattractive traction properties.

Hammann and Schisla, U.S. Pat. No. 3,411,369, issued Nov. 19, 1968, teach that 1-phenyl-1,3,3-trimethylindane can be hydrogenated at 2500 psig, starting at 90°C. However, this product appears to be an intermediate boiling isomer, with less desirable traction properties than 4,9-cis, 1-cyclohexyl-1,3,3-trimethylhydrindane.

BRIEF SUMMARY OF THE INVENTION

The present application describes isomers of 1-cyclohexyl-1,3,3-trimethylhydrindane which have superior traction properties, and discloses methods for obtaining these isomers in high yield. The process of this invention can utilize a moderate pressure range suitable for large scale operation.

A process is disclosed for the hydrogenation of 1-phenyl-1,3,3-trimethylindane to prepare selected isomers. For example, 4,9-cis,1-cyclohexyl-1,3,3-trimethylhydrindane, a fluid with improved tractive properties, can be prepared using a catalyst containing nickel, palladium or rhodium at a hydrogen pressure in the range of 600 to 1500 psig, and a temperature substantially in the range of 200°C to 225°C.

The hydrogenation of 1-phenyl-1,3,3-trimethylindane has been found to proceed in a series sequential reaction to compounds A, C and B in that order. Compounds A, B and C are predominant isomers of 1-cyclohexyl-1,3,3-trimethylhydrindane, and characterized by the following physical properties (the prior art reports are also given for comparison):

|  | $n_D^{20}$ | $d_4^{20}$ | Normal Boiling Point* |
|---|---|---|---|
| Compound A | 1.5028 | 0.9303 | 578°F |
| B | 1.5003 | 0.9452 | 600°F |
| C | 1.5045 | 0.9415 | 613°F |
| U.S. Pat. 2,629,751, ex 3 | 1.5035 | 0.9365 | 561°F |
| U.S. Pat. 3,411,369, ex 3 | 1.5055 | 0.944 | 601–603°F |

*Normal boiling points calculated from Vapor Pressure Chart, J. B. Maxwell, Data Book on Hydrocarbons, D. Van Nostrand, N.Y. 1950.
Compound C has the structure 4,9-cis-1-cyclohexyl-1,3,3-trimethylhydrindane, while compound B is the 4,9-transisomer.

Catalytic hydrogenation of 1-phenyl-1-3,3-trimethylindane can be characterized by the following equation:

$$S \xrightarrow{k_1} A \xrightarrow{k_2} C \xrightarrow{k_3} B$$

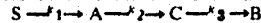

where S is the starting material and A, B and C are the products described above.

The reaction rate constants, $k$ are represented by the Arrhenius equation $$R = Ae^{\frac{-\Delta H^{\neq}}{RT}}$$

where $\Delta H^{\neq}$ is the activation energy, $T$ is temperature in °K, and $R$ is the gas constant. For the sequential reaction given above the energies of activation for the individual steps are found to be:

| $H_1^{\neq}$ | 10,500 |
| $H_2^{\neq}$ | 14,200 |
| $H_3^{\neq}$ | 30,000 calories |

BRIEF DESCRIPTION OF THE DRAWINGS

In the accompanying drawings, FIG. 2 is similar to FIG. 1 except that the reaction temperature is at 250°C. instead of 200°C.

ILLUSTRATIVE EXAMPLES

The following examples illustrate the manner in which the product isomer can be controlled by proper selection of conditions.

EXAMPLE 1

Figure 1:
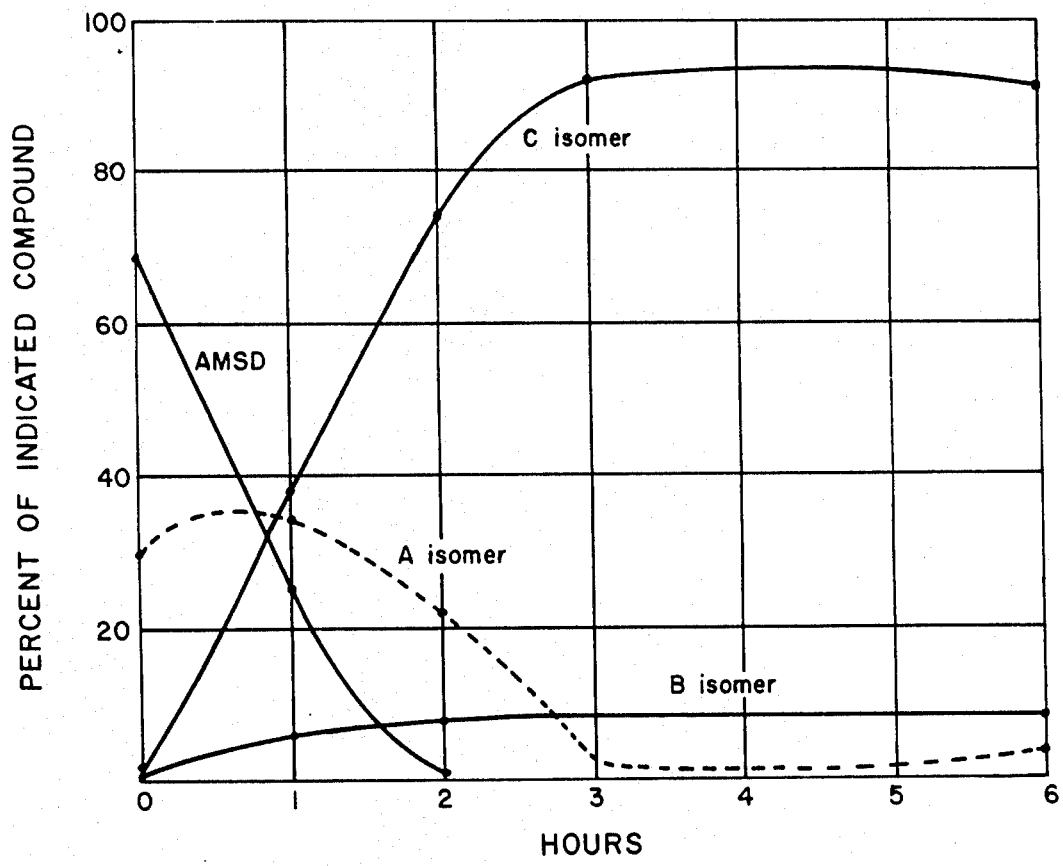
FIGS. 1 and 2 illustrate the influence of reaction time and temperature (at a given pressure and catalyst feed ratio) on isomer distribution and show how proper choice of reaction time and temperature can lead to improved (maximized) yields of a desired isomer or isomer mixture.

300 ml of molten 1-phenyl-1,3,3-trimethylindane and 15 grams of 58% nickel on kieselguhr were charged to a one-liter stirred pressure reactor. After purging with hydrogen, the reactor was pressured to 1200 p.s.i. with hydrogen and held at that pressure for the course of the reaction. Heat was applied through electrical windings, with thermostatic controls to maintain 200°C ± 10°C. Samples were analyzed by UV spectroscopy and gas chromatography at 1, 2, 3 and 6 hours, to give the compositions indicated in FIG. 1. At 6 hours, the reactor was cooled, the product withdrawn and the catalyst was removed by filtration. The viscosity of the resulting product was 38.21 cs at 100°F. and 4.54 cs at 210°F.

Example 2

Figure 2:
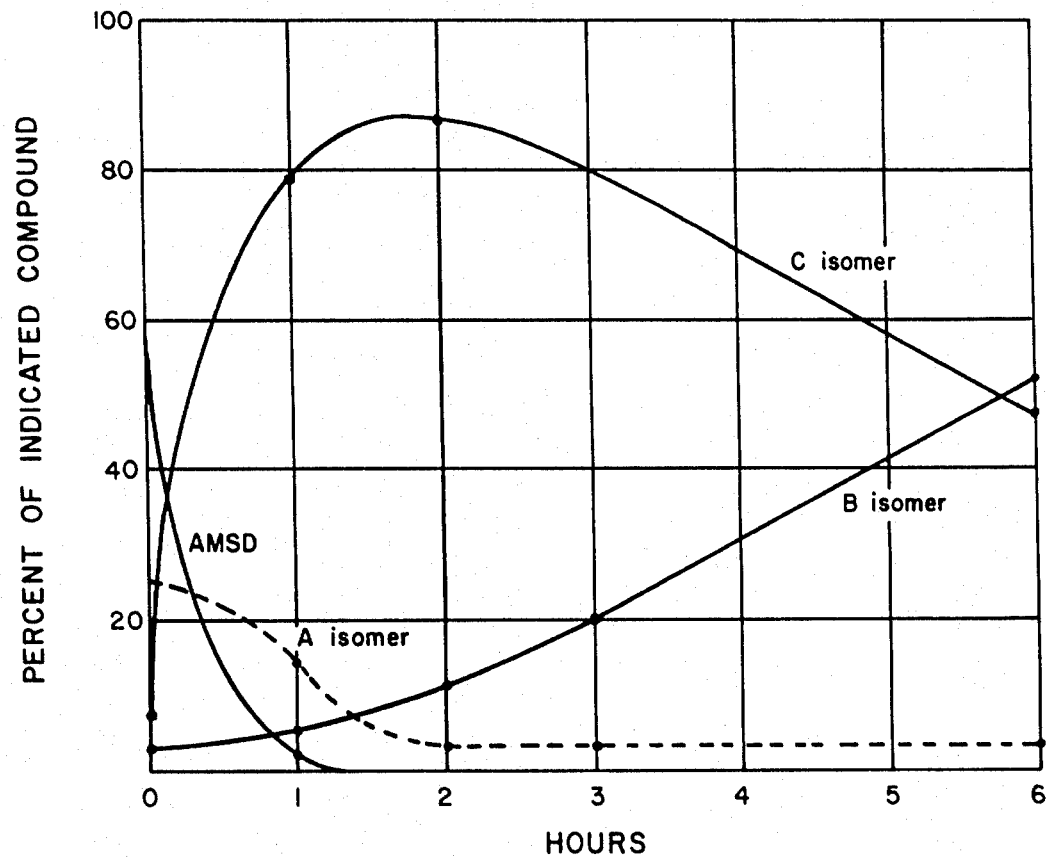

A reactor was charged and operated in manner similar to Example 1, except that the temperature was controlled at 250°C., with the results shown in FIG. 2. It is noted that product C has a maximum concentration at approximately 2 hours and then is gradually converted to product B.

Runs similar to those in Examples 1 and 2 are listed in the following table with the time for maximum C concentration given:

| Temp., °C | $H_2$ Pressure psi | Time | Products A | B | C |
|---|---|---|---|---|---|
| 175 | 1200 | 18 | 5 | 2 | 93 |
| 200 | 1200 | 6 | 2 | 6 | 92 |
| 225 | 1200 | 3 | 2 | 8 | 90 |
| 250 | 1200 | 2 | 3 | 13 | 84 |
| 275 | 1200 | 2 | 7 | 24 | 69 |
| 225 | 700 | 6 | 1 | 10 | 89 |

Example 3

A reactor was charged and operated in manner similar to Example 1, except Raney nickel was used as a catalyst, with the following results:

| Temp., °C | H₂ Pressure psi | Time | Products A | B | C |
|---|---|---|---|---|---|
| 175 | 1200 | 6 | 70 | 13 | 17 |
| 200 | 1200 | 6 | 2 | 6 | 92 |
| 225 | 1200 | 6 | 21 | 7 | 72 |
| 250 | 1200 | 6 | 20 | 10 | 64 |

In the experiments above with Raney nickel, the catalyst lost its activity at the higher temperatures, apparently because of the sintering of the nickel surface at high temperatures. The temperature range for this catalyst is narrowly limited to about 200°C.

Example 4

A high 0.5% pressure tubular flow reactor was charged with 4 liters (dry bulk volume) of rhodium on charcoal. The reactor was purged with nitrogen, then purged with hydrogen and pressured to 2500 psi with hydrogen. Temperature in the reactor was maintained at 202°C ± 11°C. 1-phenyl-1,3,3-trimethylindane was diluted with 50° by volume cyclohexane and charged to the top of the reactor at 4 liters per hour. After the reaction, the cyclohexane was removed by distillation and the resulting product was found to contain 1.6% starting material, 16.7 % compound B and 81.7% compound C.

Example 5

A high pressure tubular flow reactor was charged with 4 liters (dry bulk volume) of 58% nickel on kieselguhr pellets. The reactor was purged with nitrogen, then purged with hydrogen and pressured to 1500 psi with hydrogen. Temperature in the reactor was maintained at 220°C ± 10°C. 1-phenyl-1,3,3-trimethylindane was diluted with 50% by volume cyclohexane and charged to the reactor at 350 ml/hour. After the reaction, the cyclohexane was removed by distillation and the resulting product was found to contain 3% product A, 7% produce B, and 90% product C.

4,9-cis-1-cyclohexyl-1,3,3-trimethylhydrindane is especially useful as a component of a lubricant for a traction drive, roller clutch or limited slip differential, particularly a lubricant comprising conventional non-hydrocarbon lube additives (e.g., extreme pressure, antioxidant, antirust, antifoam, antiwear, dispersant) and a hydrocarbon base containing the hydrindane and 0.1–20 parts (based on the hydrindane) of a hydrogenated linear, liquid polymer of isobutylene.

The invention claimed is:

1. A process for the hydrogenation of 1-phenyl-1,3,3-trimethylindane comprising contacting said indane or a feed consisting essentially of said indane with hydrogen and with a hydrogenation catalyst containing nickel, palladium or rhodium, at a hydrogen pressure in the range of 600 to 1500 psig and a temperature in the range of 200° to 225°C, and recovering a product of said contacting which consists essentially of perhydrogenated 1-phenyl-1,3,3-trimethylindane and including a major proportion of 4,9-cis-1-cyclohexyl-1,3,3-trimethyl hydrindane.

2. Process according to claim 1 wherein at least 80% of the product of said hydrogenation is 4,9-cis-1-cyclohexyl-1,3,3-trimethylhydrindane.

3. Process according to claim 2 wherein said catalyst consists essentially of nickel on an inert carrier.

4. Process according to claim 3 wherein said inert carrier is kieselguhr and said pressure is in the range of 1000–1500 p.s.i.

5. Process according to claim 1 wherein said catalyst comprises about 58% nickel on kieselguhr.

6. Process according to claim 1 wherein said contacting is for sufficient time to maximize production of 4,9-cis,1-cyclohexyl-1,3,3-trimethylhydrindane and minimize production of other isomers of hydrogenated 1-phenyl-1,3,3-trimethylindane.

7. Process according to claim 6 wherein said catalyst consists essentially of about 58% nickel on kieselguhr.

8. Process according to claim 7 wherein said contacting is at 220°C. ± 10°C.

9. Process according to claim 8 wherein said pressure is about 1500 psi.

10. Process according to claim 1 wherein said products have a normal boiling point of at least 578°F and a refractive index at 20°C of less than 1.5055.

11. Process according to claim 1 wherein said catalyst consists essentially of nickel, palladium or rhodium.

12. Process according to claim 1 wherein a major proportion of the product of said contacting boils at about 613°F.

* * * * *